(12) United States Patent
Dabsch et al.

(10) Patent No.: US 11,226,245 B2
(45) Date of Patent: Jan. 18, 2022

(54) FORCE SENSOR

(71) Applicant: Technische Universitaet Wien, Vienna (AT)

(72) Inventors: Alexander Dabsch, Vienna (AT);
Franz Keplinger, Vienna (AT);
Christoph Rosenberg, Kottingbrunn (AT)

(73) Assignee: Technische Universitaet Wien, Vienna (AT)

( * ) Notice: Subject to any disclaimer, the term of this patent is extended or adjusted under 35 U.S.C. 154(b) by 120 days.

(21) Appl. No.: 16/498,437

(22) PCT Filed: Mar. 31, 2017

(86) PCT No.: PCT/AT2017/060082
§ 371 (c)(1),
(2) Date: Sep. 27, 2019

(87) PCT Pub. No.: WO2018/476069
PCT Pub. Date: Oct. 4, 2018

(65) Prior Publication Data
US 2021/0116313 A1    Apr. 22, 2021

(51) Int. Cl.
*G01L 1/10* (2006.01)
(52) U.S. Cl.
CPC .............. *G01L 1/106* (2013.01); *G01L 1/103* (2013.01)
(58) Field of Classification Search
CPC .................... G01L 1/106; G01L 1/103
See application file for complete search history.

(56) References Cited

U.S. PATENT DOCUMENTS

| 5,095,763 A | 3/1992 | Delatorre | |
| 2008/0210005 A1* | 9/2008 | Rougeot | G01C 19/5747 73/504.12 |
| 2014/0026686 A1* | 1/2014 | Bashir | G01G 19/14 73/865 |
| 2017/0252187 A1* | 9/2017 | Chapman | A61F 2/4657 |

FOREIGN PATENT DOCUMENTS

| JP | S61 194325 A | 8/1986 |
| WO | 2011/163058 A2 | 12/2011 |

OTHER PUBLICATIONS

International Search Report in PCT/AT2017/060082, dated Dec. 12, 2017.

* cited by examiner

*Primary Examiner* — Paul M. West
(74) *Attorney, Agent, or Firm* — Collard & Roe, P.C.

(57) ABSTRACT

A force sensor includes a frame and an oscillation structure which has arms and can oscillate freely in the frame. The arms are fixed to suspension frame regions and run transverse to one another at least in sections. At least one conductor extends along at least two arms. An AC voltage can be applied to the at least one conductor to excite at least one oscillation mode of the oscillation structure with a resonant frequency using Lorentz force. The force sensor is designed such that the suspension regions are at least partially spatially displaced relative to one another when a force is applied to the frame, that the magnitude of the spatial displacement of the suspension regions depends on the magnitude of the force, and that the spatial displacement of the suspension regions causes detuning of the resonant frequency, the magnitude of which depends on the spatial displacement magnitude.

26 Claims, 3 Drawing Sheets

FORCE SENSOR

CROSS REFERENCE TO RELATED APPLICATIONS

This application is the National Stage of PCT/AT2017/060082 filed on Mar. 31, 2017, the disclosure of which is incorporated by reference. The international application under PCT article 21(2) was not published in English.

FIELD OF THE INVENTION

The present invention relates to a force sensor comprising a frame as well as an oscillation structure, which has multiple arms and can oscillate freely in the frame.

STATE OF THE ART

In practice, strain gauges are generally used for measuring forces, which gauges are attached to components that are exposed to forces and deform when forces occur. In this way, it is possible to calculate the force indirectly by way of the strain that is determined. It is true that strain gauges are relatively precise and can also be used for measuring force vectors in at least two dimensions if multiple strain gauges, disposed transverse to one another, are used. However, fundamental problems occur in the determination of pressure forces as well as due to imperfections in the installation of strain gauges, which usually takes place by means of gluing.

Furthermore, in certain applications, in particular in applications of biology and/or medicine, very small forces in the range of less than 1 µN or even smaller, equal to 1 nN (in other words in the pico-Newton range) occur. Such small forces usually cannot be measured using strain gauges.

TASK OF THE INVENTION

It is therefore the task of the present invention to create an improved possibility for measurement of forces, which avoids the disadvantages described above. In particular, it is supposed to be possible to measure very small forces, preferably down to the pN range.

PRESENTATION OF THE INVENTION

The core of the invention for accomplishing the stated task is to make available a force sensor having an oscillation structure, which oscillation structure can be excited to oscillate in a magnetic field, by means of having alternating current applied to it, and the resonance frequency of which structure changes if a force that acts on the force sensor leads to a distortion of the force sensor. The resulting detuning of the resonance frequency is a measure of the magnitude of the distortion and thereby of the magnitude of the acting force. It is therefore possible to measure very small forces, which lie in the nN range or even the pN range, by means of the dimensioning and design of the structure of the force sensor, in particular as a MEMS (micro-electro-mechanical system), and as a function of the resolution capacity of the frequency measurement.

For this reason, according to the invention, a force sensor is provided, comprising a frame as well as an oscillation structure, which has multiple arms and can oscillate freely in the frame, wherein the arms are fixed in place on suspension regions of the frame and run transverse to one another, at least in certain sections, wherein at least one conducting means is provided, which extends along at least two arms, so as to allow a flow of current in the form of moving charge carriers at least between two suspension regions, wherein the at least one conducting means can have an alternating voltage applied to it, so as to excite at least one oscillation mode of the oscillation structure with a resonance frequency, particularly in an unstressed state of the force sensor, making use of the Lorentz force, when the oscillation structure is situated in a magnetic field, wherein the force sensor is designed in such a manner that the suspension regions are displaced spatially relative to one another, at least in part, when the frame has a force applied to it, that the magnitude of the spatial displacement of the suspension regions depends on the magnitude of the force, that the spatial displacement of the suspension regions brings about detuning of the resonance frequency, and that the magnitude of the detuning depends on the magnitude of the spatial displacement of the suspension regions.

In other words, each arm has an end or an end region with which it is fixed in place on one of the suspension regions.

Furthermore, each arm has a section that runs transverse at least to a section of another arm. Preferably, in this regard, each arm runs in a straight line, at least in certain sections, wherein, however, a curved progression, at least in certain sections, is also conceivable.

The expanse of the conducting means along the at least two arms is preferably understood to be continuous, so as to allow the flow of current along these arms. Based on the coupling of the at least one conducting means with the arms or with the oscillation structure, the Lorentz force can also act on the oscillation structure when the oscillation structure or the force sensor is situated in the magnetic field. If the at least one conducting means now has an alternating voltage applied to it, and if the oscillation structure or its arms is/are situated in a magnetic field, then on the basis of the resulting oscillating Lorentz force, oscillation of the oscillation structure is excited. In this regard, in particular in the case of a magnetic field that is static over time or changes only comparatively slowly, particularly effective excitation can take place in that the frequency of the alternating current corresponds to a resonance frequency of the oscillation structure or to an oscillation mode of the oscillation structure.

An embodiment of the force sensor that is advantageous in terms of production technology occurs in that a conductor track, for example composed of gold or platinum, is provided as the at least one conducting means. Accordingly, the conductor track runs, at least in certain sections, along the longitudinal direction of one arm, and, at least in certain sections, along the longitudinal direction of another arm.

In order to ensure protection of the at least one conducting means against external influences, it can also be provided that the at least one is integrated into the oscillation structure or into its arms. In this case, the at least one conducting means can be structured of metal, in particular of aluminum, for example as a micromechanical structure.

It would also be conceivable to structure the oscillation structure or its arms, as well as the at least one conducting means, in one piece, at least in certain sections, so as to exclude that the at least one conducting means is mechanically damaged or actually destroyed by the oscillations of the oscillation structure. In other words, in this case the oscillation structure or its arms is/are itself/themselves electrically conductive, at least in certain sections.

With regard to the spatial displacement of the suspension regions, it should be noted that it is conceivable, for example, that the acting force or the acting forces is/are oriented in such a manner that two suspension regions maintain the same distance from one another but not from other suspension regions.

Detuning of the resonance frequency is achieved, in particular, as compared with an unstressed state, in other words one in which no force of any kind is acting on the force sensor. Furthermore, of course detuning of the resonance frequency also occurs as compared with a state that was previously present, where an (at least slightly different) force effect already prevailed, and a resonance frequency that was different as compared with the unstressed state was present. In other words, a change in a force effect also results in a change in or detuning of the resonance frequency.

It should be noted that in principle different oscillation modes can be excited. In particular, oscillation modes having a resonance frequency that is particularly sensitive to distortions or displacements only in a specific direction can also be excited, in targeted manner, and thereby a direction-resolved force measurement can take place. In the case of excitability of such oscillation modes for two linearly independent directions, two-dimensional resolution of the force can take place; in the case of excitability of such oscillation modes for three linearly independent directions, three-dimensional resolution can take place. In other words, a multi-axial force sensor can be implemented.

Furthermore, it should be noted that the measured force can also result from a torque that acts on the frame, which can lead to torsion of the frame and corresponding displacements of the suspension regions. Accordingly, the force sensor according to the invention can therefore fundamentally be used also for measurement of torques or torsions.

Finally, it should be noted that in the case of multiple conducting means in the form of conductor tracks, not all the conductor tracks necessarily have to be used simultaneously for excitation of oscillations or to have alternating voltage applied to them simultaneously. For example, one of the conductor tracks can be used for temperature measurement, in that this conductor track does not have alternating voltage applied to it, but rather the electrical resistance of this conductor track is measured. In addition or alternatively, one or more additional conductor tracks, particularly composed of platinum, can be provided for the temperature measurement, the electrical resistance of which tracks is used to determine the temperature. In this regard, these additional conductor tracks can run, at least in certain sections, over the oscillation structure, in particular, at least in certain sections, over at least one of the arms of the oscillation structure and/or in at least one of the suspension regions.

With regard to installation of the force sensor according to the invention on an object that is exposed to force effects to be determined, it should be stated that the most varied attachment possibilities exist, which cannot be conclusively listed at this point. Typically, in this regard, the force sensor according to the invention is connected with the object in fixed manner, and is disposed in level manner when no force effect is present. For example, the force sensor according to the invention can be introduced, in the case of monitoring of a specific component, into the surface of the component, i.e. into a recess of the component provided for this purpose, and then be embedded (naturally without gluing up the oscillation structure). A further, more specific application example would be use of the force sensor according to the invention as a replacement for and/or expansion of a load cell, where the force is applied from the outside. In this regard, it would also be conceivable to mount the force sensor only on one side (upright).

In order to allow particularly stable oscillation of the oscillation structure with regard to external influences, it is provided, in the case of a preferred embodiment of the force sensor according to the invention, that the suspension regions are disposed in the region of corners of the frame.

In order to allow a solution that is simple in terms of production technology, it is provided, in the case of a preferred embodiment of the force sensor according to the invention, that four corners of the frame are provided, which are disposed in a plane of the frame and preferably form a rectangle, particularly preferably a square in the plane.

Typically, the expanse of the frame is clearly less in a normal direction that stands normal to the plane of the frame than in the plane. For example, the frame can have a size of 1 mm*1 mm to 15 mm 15 mm in the plane, and have a size of 100 µm to 500 µm, for example, preferably 250 µm, in the normal direction. In the normal direction, the oscillation structure can have a size that is reduced once again, for example from 10 µm to 50 µm, preferably 20 µm.

In order to expand the sensitivity of the force sensor in the direction of particularly small forces, it is provided, in the case of a preferred embodiment of the force sensor according to the invention, that the frame has at least one meander-shaped section, which is preferably disposed between at least two suspension regions. In this regard, the meander structure brings about the result—similar to a helical spring—of elastic deformability of the corresponding section of the frame along at least one direction in the case of a reduced force effect, in comparison with the force effect required for the same deformation without a meander structure.

In other words, deformability of the frame is already made possible at very small forces. Preferably, in this regard, the at least two suspension regions are connected with one another by means of a section of the frame, which section contains the meander-shaped section.

Preferably, each side of the frame has such a meander-shaped section and/or a meander-shaped section is provided along the circumference of the frame, between two consecutive suspension sections, in each instance, so as to achieve an increased force sensitivity in at least two dimensions, i.e. for forces in all the directions within the plane of the frame.

Vice versa, it is also possible to intentionally provide for no meander-shaped section in the frame, in order to shift the measurement range in the direction of higher forces, in targeted manner, analogous to what was stated above.

In order to guarantee that the oscillation structure has oscillation modes in the most varied directions, which modes can subsequently be excited, it is provided, in the case of a preferred embodiment of the force sensor according to the invention, that the number of arms is a whole-number multiple of four, preferably precisely four. The latter number in a way represents the optimum between the possible oscillation modes to be excited, precise splitting of the stress to be measured in the x and y direction (or in two directions at a right angle to one another, in particular in the plane of the frame), as well as the moments that occur, relative to one another. Furthermore, in the case of more than four arms, the system becomes more complicated again with regard to the possible oscillations as well as the temperature dependence.

In the case of a preferred embodiment of the force sensor according to the invention, it is provided that the oscillation structure has a coupling element by means of which the arms are mechanically coupled with one another, wherein each arm is preferably fixed in place on the coupling element with one end. By means of a suitable selection or structural configuration of the coupling element, the oscillation modes of the oscillation structure can be structured in targeted manner, so as to achieve particularly stable oscillation behavior, for example, in particular in preferred directions.

In the simplest case, the coupling element could also simply be essentially point-shaped, in other words if the arms meet at this point and, in particular, project away from this point in star shape. In the case of four straight-line arms, this then results in a simple cross or X shape.

In the case of a preferred embodiment of the force sensor according to the invention, it is provided that the coupling element forms an edge around a surface that preferably lies in a plane of the frame. It has been shown that very stable oscillation modes can be achieved by means of this configuration.

In this regard, the coupling element does not have to be angular or polygonal, but rather can also be round or at least round in certain sections.

In the case of a particularly simple embodiment of the force sensor according to the invention, in terms of production technology, it is provided that the coupling element is polygonal, preferably four-cornered, preferably rectangular, particularly preferably square.

In a particularly preferred embodiment of the force sensor according to the invention, it is provided that each arm is fixed in place on the coupling element in the region of a corner point of the element.

Preferably, in this regard, each arm is fixed in place on the coupling element with an end.

It has been shown that this arrangement guarantees particularly stable oscillation modes, which can, in particular, form normal modes.

In order to prevent arching of the arms—and thereby detuning of the resonance frequency—on the basis of thermally caused expansion or contraction, it is provided, in the case of a preferred embodiment of the force sensor according to the invention, that the arms are fixed in place on the respective suspension region, in each instance, by means of a temperature-compensation structure that is meander-shaped at least in certain sections. The respective temperature-compensation structure can be formed, in this regard, by a cantilever arm. The temperature-compensation structures structured in this way and fixed in place on the frame are themselves subject to thermal expansion or contraction, and are assigned to the arms in such a manner that the thermal expansion of the arms is compensated and thereby arching is prevented.

Preferably, the temperature-compensation structures are each structured in one piece with the related arm.

In order to be able to produce force sensors having a well-defined structure and well-defined mechanical properties of the frame as well as of the oscillation structure, it is provided, in the case of a preferred embodiment of the force sensor according to the invention, that the frame and the oscillation structure are produced in one piece from silicon, preferably mono-crystalline silicon. This allows production on the basis of a silicon wafer, for example, in what is called a silicon-on-insulator (SOI) method, which is known.

In order to determine the (resonance) oscillations of the oscillation structure, in particular the frequencies of the (resonance) oscillations, known read-out means can be used. Accordingly, a system comprising a force sensor according to the invention as well as read-out means for determination of the resonance frequency is provided, according to the invention, wherein the read-out means preferably comprise at least one optical sensor and/or at least one capacitive sensor. As has been said, such sensors are known.

Capacitive sensors are particular suitable for measurement of oscillation modes, the oscillation plane or amplitude of which stands normal to the plane of the frame, wherein the capacitive sensors can then be disposed above and/or below the plane of the frame. Using optical sensors, it is particularly possible to measure oscillation modes, the oscillation plane or amplitude of which lies in the plane of the frame. For example, an optical measurement can take place in the transmission geometry (normal to the plane of the frame), and in this way, the periodic change in the placement or geometry of the oscillation structure in the plane of the frame can be detected.

In a preferred embodiment of the system according to the invention, it is preferred that a control unit is provided, using which an alternating voltage can be applied to the at least one conducting means, so as to excite the oscillation structure to cause it to oscillate, and wherein the control unit is connected with the read-out means for determination of the resonance frequency, wherein preferably at least two conducting means are provided and the control unit is designed for applying counter-phase alternating voltages to the at least two conducting means. Therefore the control unit can use alternating voltages of different frequencies—in particular one after the other—for application, and can determine at least one resonance frequency on the basis of detection of the resulting oscillation of the oscillation structure, in each instance, wherein the selection of the next frequency can be made dependent on the current detection result.

Application of counter-phase alternating voltage can have advantages in terms of measurement technology, in particular if not only the frequency but also the amplitude is supposed to be determined, since in this way, a difference signal of the read-out means, using which the amplitudes of the oscillation modes are measured, can be generated very easily and without additional computation effort. For example, implementation of a differential capacitor would be possible in the case of a capacitive read-out of the amplitudes.

In order to be able to determine at least one resonance frequency particularly rapidly, it is provided, in the case of a preferred embodiment of the system according to the invention, that the control unit is designed for applying at least one pulse of alternating voltages to the at least one conducting means, so as to excite the oscillation structure to cause oscillations, wherein the at least one pulse has a bandwidth of frequencies, which bandwidth comprises the resonance frequency of at least one oscillation mode of the oscillation structure, preferably in an unstressed state of the force sensor. The sequential application of alternating voltages at different frequencies as described above is clearly more time-consuming in comparison. In particular proceeding from knowledge of the at least one resonance frequency in the unstressed state (i.e. without force effect on the sensor), a suitable or sufficiently great frequency band can be selected, so as to determine the resonance frequency that has been detuned as the result of the force effect.

In practice, use of a scanner, in particular a hand scanner, for example, would be possible, which scanner is brought into the vicinity of the force sensor and brings about application of the at least one pulse to the at least one conducting means (in particular inductively). Furthermore, the read-out means as well as the control unit can be integrated into the hand scanner. Accordingly, the force sensor can remain mounted on an object, in the case of which object one wishes to determine possible force effects on this object only from time to time (and not continuously).

Such an object can be, for example, a building or a prosthesis worn by a human being.

Fundamentally, it is possible, in this regard, to also excite multiple resonance frequencies for different modes with one pulse.

In order to excite different resonance frequencies in targeted manner, for example in order to conveniently make use of direction dependencies of the corresponding oscillation modes for a direction-resolved force measurement, in terms of measurement technology, it is provided, in the case of a particularly preferred embodiment of the system according to the invention, that the control unit is designed for application of multiple pulses of alternating voltages to the at least one conducting means, one after the other, wherein the different pulses comprise resonance frequencies of different oscillation modes of the oscillation structure, preferably in the unstressed state of the force sensor. In other words, a first pulse comprises at least one first resonant oscillation mode of the oscillation structure, preferably in the unstressed state; a further pulse comprises at least one further resonant oscillation mode of the oscillation structure, preferably in the unstressed state, wherein the first oscillation mode and the further oscillation mode are different.

In the case of a preferred embodiment of the system according to the invention, it is provided that the system comprises means for generation of the magnetic field, preferably at least one permanent magnet and/or at least one Helmholtz coil. In this way, it can be ensured that an at least somewhat defined magnetic field is always present for the force measurements, and thereby desired oscillation modes of the oscillation structure can be set or detected very precisely, so as to allow very precise force measurements.

In this regard, the magnetic field does not need to be defined particularly precisely, since it is sufficient for excitation of a desired oscillation mode of the oscillation structure to arrive at the corresponding resonance frequency by means of a suitable selection of the frequency of the alternating voltage. The means for generation of the magnetic field therefore also do not need to be attached or disposed on the force sensor according to the invention in fixed or permanent manner.

Instead, the means for generation of the magnetic field, in particular a permanent magnet, can be disposed in the scanner, in particular the hand scanner already mentioned above. The scanner then serves not only for application of alternating voltage, but at the same time also makes the magnetic field required for oscillation excitement by means of the Lorentz force available.

In the manner described, excitation of what are called in-plane oscillations, in other words of oscillation modes, the oscillation plane or amplitude of which lies in the plane of the frame, can also be easily guaranteed. In this way, torsions of the frame or torques applied to it can be measured particularly well. Accordingly, it is provided, in the case of a particularly preferred embodiment of the system according to the invention, that the control unit is designed for excitation of oscillations of the oscillation structure in a plane of the frame.

As has already been stated, the force sensor according to the invention is particularly suitable for applications in biology or medicine, for example on medical instruments, as well as in prosthetics. The comfort of a prosthesis and the prevention of injury to the body, in particular, are essentially dependent on an optimal distribution of force. It is conceivable to equip prostheses and/or implants with force sensors according to the invention, so as to obtain feedback regarding the respective stress state when using the prostheses or implants.

Accordingly, a prosthesis comprising a force sensor according to the invention and/or a system according to the invention is provided, according to the invention.

BRIEF DESCRIPTION OF THE FIGURES

The invention will now be explained in greater detail using an exemplary embodiment. The drawings are intended as examples and are intended to present the idea of the invention, but by no means to restrict it or actually to represent it conclusively.

In this regard, the drawing shows.

WAYS TO IMPLEMENT THE INVENTION

Figure 1:
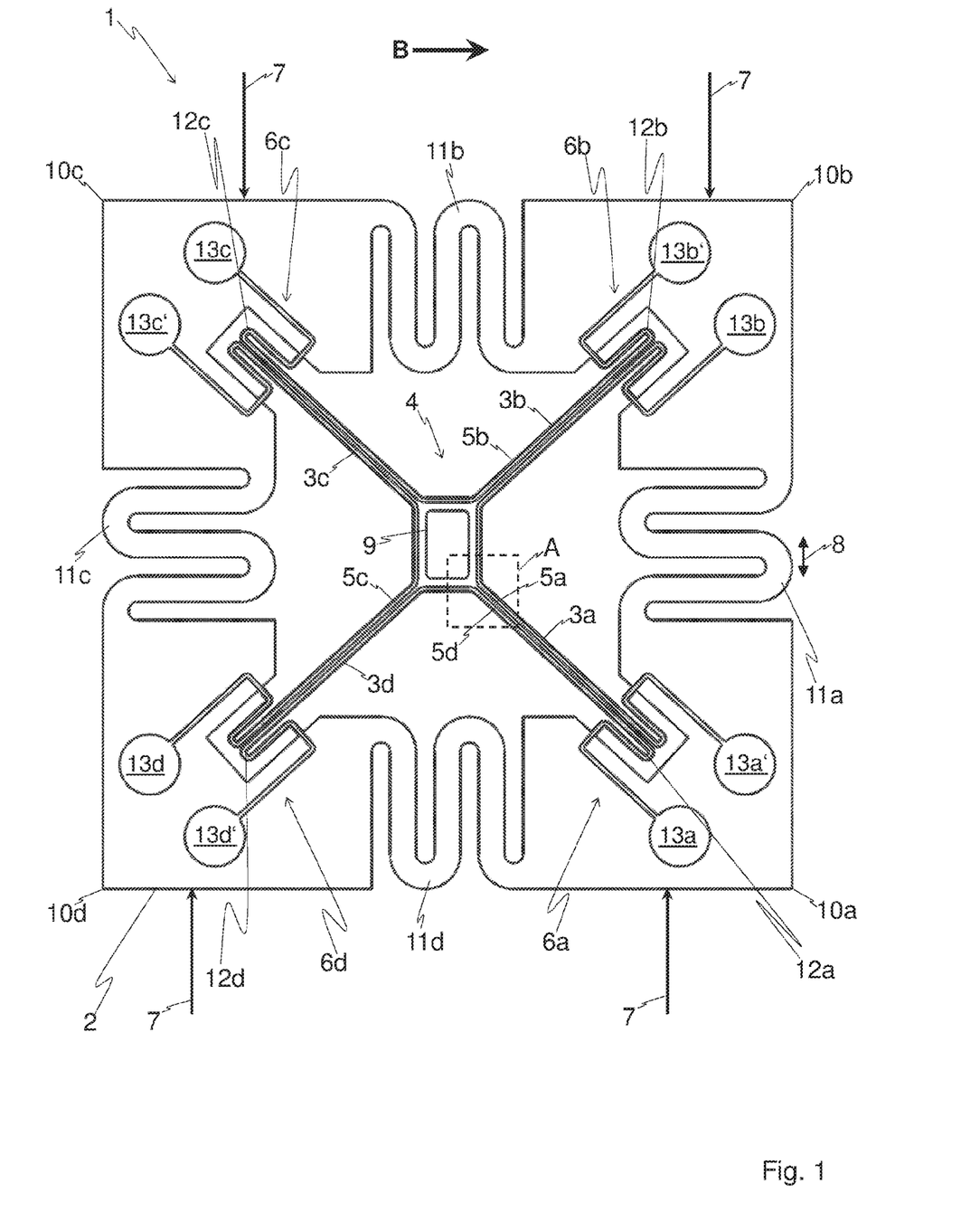
FIG. 1 a force sensor according to the invention in a top view.

FIG. 1 shows a force sensor 1 according to the invention in a top view, which sensor is suitable for measurement of very small forces of less than or equal to 1 µN, preferably of less than or equal to 1 nN. The force sensor 1 has a frame 2 having four corners 10a, 10b, 10c, 10d, which lie in a plane of the frame 2, wherein in FIG. 1, the plane of the frame 2 coincides with the plane of the drawing. In the exemplary embodiment shown, the corners 10a-d mark corner points of a square having a side length of typically 2 mm. It should be emphasized, however, that fundamentally, other shapes, in particular a rectangular shape of the frame 2 would also be possible.

The force sensor 1 furthermore has an oscillation structure 4, which can oscillate freely in the frame 2. For this purpose, in the exemplary embodiment shown, the oscillation structure 4 has four arms 3a, 3b, 3c, and 3d, with which the oscillation structure 4 is attached to the frame 2, wherein each of the arms 3a-d is fixed in place, with an end, in a related suspension region 6a, 6b, 6c, 6d of the frame 2. The suspension regions 6a-d are disposed in the region of one of the corners 10a-d of the frame 2, in each instance.

The arms 3a-d furthermore each have an end that is fixed in place on a coupling element 9 of the oscillation structure 4. The coupling element 9 in turn is disposed centered within the frame 2 in the exemplary embodiment shown, and configured to be essentially rectangular, wherein each of the arms 3a-d joins the coupling element 9 in the region of one of its corner points.

In the exemplary embodiment shown, each of the arms 3a-d extends between the related suspension region 6a-d and the related corner point of the coupling element 9 with an essentially straight-line section. In this way, an arrangement of the arms 3a-d occurs that is similar to an X shape, so that each of the arms 3a-d runs transverse to two of the other arms 3a-d, at least in certain sections (the said straight-line sections of the arms 3a and 3c run parallel to one another and transverse to the corresponding straight-line sections of the arms 3b and 3d and vice versa).

In the exemplary embodiment shown, conducting means in the form of conductor tracks 5a, 5b, 5c, 5d, preferably composed of platinum, are disposed on the arms 3a-d. Each of the conductor tracks 5a-d extends along two of the arms 3a-d, in each instance, so as to make possible a flow of current in the form of moving charge carriers, in particular electrons, between the suspension regions 6a-d of the respective two arms 3a-d. In concrete terms, in the exemplary embodiment shown, the conductor track 5a extends along the arms 3a and 3b between the suspension regions 6a and 6b, the conductor track 5b extends along the arms 3b and 3c between the suspension regions 6b and 6c, the conductor track 5c extends along the arms 3c and 3d between the suspension regions 6c and 6d, and the conductor track 5d extends along the arms 3d and 3a between the suspension regions 6d and 6a.

In order to be able to apply alternating voltage to the conductor tracks 5a-d in simple manner, circular contact points 13a, 13a', 13b, 13b', 13c, 13c', 13d, 13d' are provided in the suspension regions 6a-d. These points are structured to be so large that contact with an alternating voltage source or with conductors of such a source (not shown) for applying alternating voltage to at least one of the conductor tracks 5a-d is conveniently possible. In concrete terms, the conductor track 5a runs between the contact points 13a' and 13b, the conductor track 5b runs between the contact points 13b' and 13c, the conductor track 5c runs between the contact points 13c' and 13d, and the conductor track 5d runs between the contact points 13d' and 13a.

Figure 2:
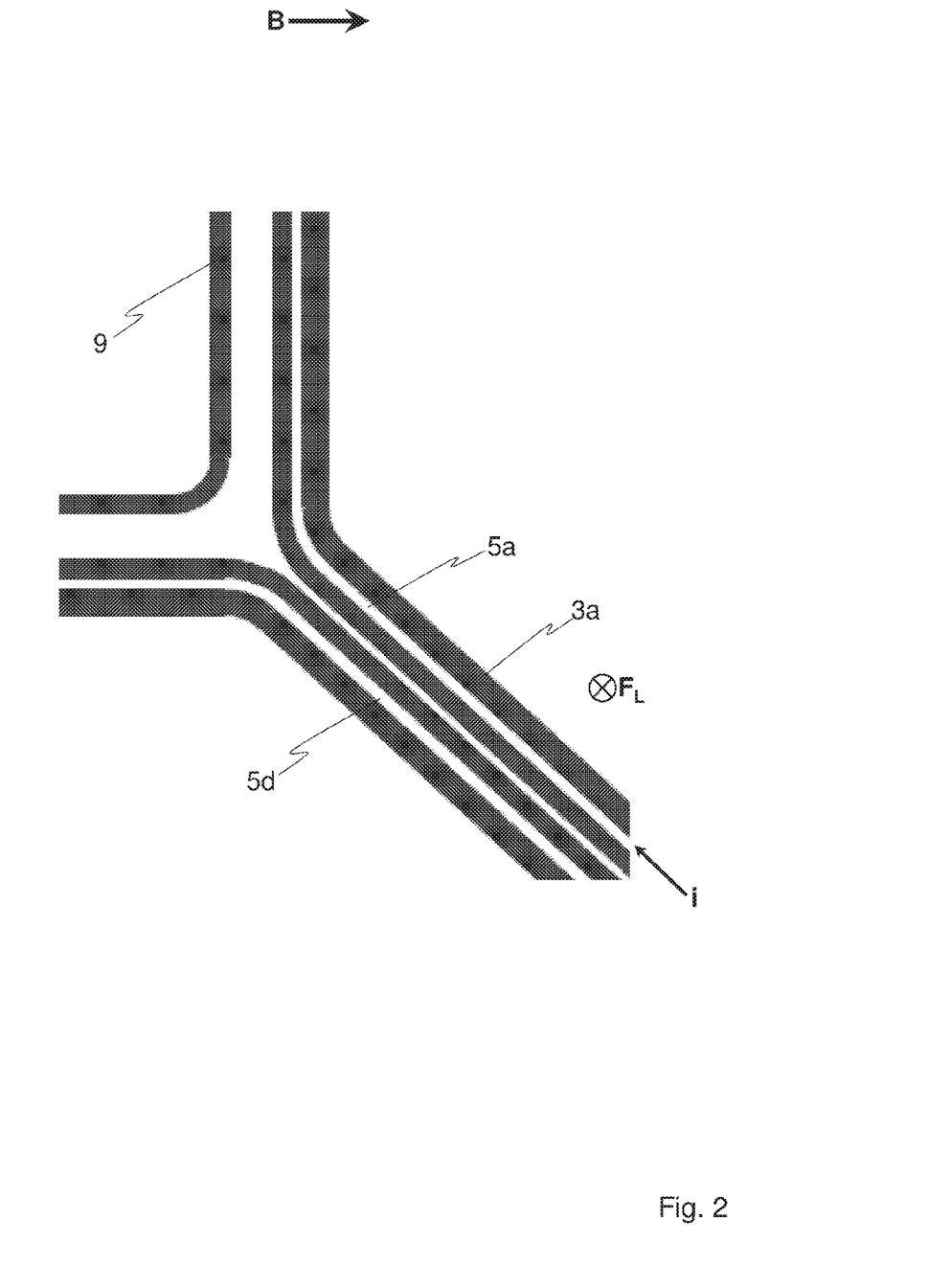
FIG. 2 a magnified view of Detail A from FIG. 1.

For a better illustration of the conductor tracks 5a-d, FIG. 2 shows a magnified view of Detail A from FIG. 1, in which the conductor tracks 5a and 5d can be clearly seen. Furthermore, in FIG. 2 an alternating current i that flows through the conductor track 5a is symbolized with an arrow. If, in this case, the force sensor 1 is disposed in a magnetic field having a flux density B, which is assumed to be uniform with a vector that points from left to right in FIG. 1 and FIG. 2, in the exemplary embodiment shown, in the entire region of the force sensor 1, this results in a Lorentz force $F_L$ that is shown schematically in FIG. 2, stands normal to the plane of the drawing and points into it. If the alternating current changes its sign or its direction, then the Lorentz force $F_L$ also points in the opposite direction (in other words out of the plane of the drawing). The Lorentz force acts on the charge carriers in the conductor track 5a and thereby on the conductor track 5a itself or on the arms 3a, 3b, and excites the arms 3a and 3b and thereby the entire oscillation structure 4 to oscillate in the frame 2, by means of the constant change in sign. Particularly efficient excitation takes place if the alternating current i has a resonance frequency, in other words the frequency of a resonant oscillation mode of the oscillation structure 4.

It should be noted that not all the conductor tracks 5a-d necessarily have to be used simultaneously for excitation of oscillations of the oscillation structure 4 or to have alternating voltage applied to them simultaneously. In FIG. 2, the conductor track 5d, for example, could intentionally not have alternating voltage applied to it, so that no alternating current i flows through the conductor track 5d (but rather, in FIG. 2, only through the conductor track 5a). Then the conductor track 5d can be used for temperature measurement, for example, in that the electrical resistance of the conductor track 5d is measured, wherein in the case of this measurement, the contact points 13d' and 13a can be used for contacting.

The resonance frequency of the oscillation structure 4 is particularly dependent on the relative position of the suspensions regions 6a-d to one another. A change brings about tensioning of the oscillation structure 4, in particular of the arms 3a-d, and this results in a corresponding change in the resonance frequency. In order to be able to utilize this effect optimally for force measurement, the force sensor 1 is designed in such a manner that the suspension regions 6a-d shift spatially relative to one another, at least in part, when a force 7 is applied to the frame 2, that the magnitude of the spatial displacement 8 of the suspension regions 6a-d depends on the magnitude of the force 7, that the spatial displacement 8 of the suspension regions 6a-d brings about detuning of the resonance frequency, and that the magnitude of the detuning depends on the magnitude of the spatial displacement 8 of the suspension regions 6a-d.

Calculation of the magnitude of the force 7 can be performed in that the resonance frequency of the oscillation structure 4 in an unstressed state of the force sensor 1, in other words without any force effect, is known or determined, and then the resonance frequency in the stressed state, in other words when the force 7 acts on the force sensor 1 or the frame 2, is known or determined. Likewise, it is possible, proceeding from a stressed state and knowledge or determination of the resonance frequency in this stressed state, to determine the corresponding force change (from the stressed state to the further stressed state) in the case of a further stressed state with a different force 7.

Forces 7 that have at least one component within the plane of the frame 2 can be measured particularly well. In FIG. 1, the force 7 shown in the drawing lies completely within the plane of the frame 2. In this regard, pressure from above is exerted downward against the frame 2, in the region of the suspension regions 6b, 6c, and pressure from below is exerted upward in the region of the suspension regions 6d, 6a. In this example, the suspension regions 6b, 6c, on the one hand, and the suspension regions 6d, 6a, on the other hand, are displaced toward one another by the displacement 8. The relative position of the suspension regions 6d and 6a to one another does not change during this process, and neither does the relative position of the suspension regions 6b and 6c to one another.

In order for the displacement 8 to be sufficiently great even in the case of very small forces 7, the frame 2 has meander-shaped sections 11a, 11b, 11c, 11d, which are disposed between two of the suspension regions 6a-d, in each instance, and promote elastic deformability of the frame 2 in a direction parallel to the connection line between these two of the suspension regions 6a-d. In the exemplary embodiment shown, the meander-shaped sections 11a and 11c are deformed by the force 7, and this leads to the displacement 8.

In order to prevent thermally related arching or tensioning based on temperature changes, by means of expansion or contraction of the arms 3a-d, which would bring with them a change in the resonance frequency of the oscillation structure 4, temperature-compensation structures 12a, 12b, 12c, 12d are provided in the exemplary embodiment shown. Each of the arms 3a-d is attached to the frame by means of one of the temperature-compensation structures 12a-d. The temperature-compensation structures 12a-d are structured in meander shape. A temperature change results in expansion or contraction of the temperature-compensation structures 12a-d, which precisely compensates the thermal expansion or contraction of the related arm 3a-d, so that no detuning takes place.

In this regard, the conductor tracks 5a-d run along the temperature-compensation structures 12a-d, in other words also in meander shape, at least in certain sections.

In the exemplary embodiment shown, frame 2 and oscillation structure 4 of the force sensor 1 are produced by means of known silicon-on-insulator technology. In the case of this production method, the frame 2, together with the oscillation structure 4, can be produced in one piece in a production frame, wherein after completion, the frame 2 or the force sensor 1 is broken out of the production frame at planned breaking points provided for this purpose.

In order to determine the (resonance) oscillations of the oscillation structure 4, in particular the frequencies of the (resonance) oscillations, known read-out means can be used, in particular optical sensors 15 and/or capacitive sensors (not shown). Capacitive sensors are particularly suitable for measurement of oscillation modes, the oscillation plane or amplitude of which stands normal to the plane of the frame 2, wherein the capacitive sensors can then be disposed above and/or below the plane. Oscillation modes, the oscillation plane or amplitude of which lies in the plane of the frame 2, in particular, can be measured using optical sensors 15. For example, an optical measurement can take place in transmission geometry (transverse, in particular normal to the plane of the frame 2; the at least one optical sensor 15 is then disposed above and/or below the plane of the frame 2), and thereby the periodic change in the placement or geometry of the oscillation structure 4 in the plane of the frame 2 can be detected.

Figure 3:
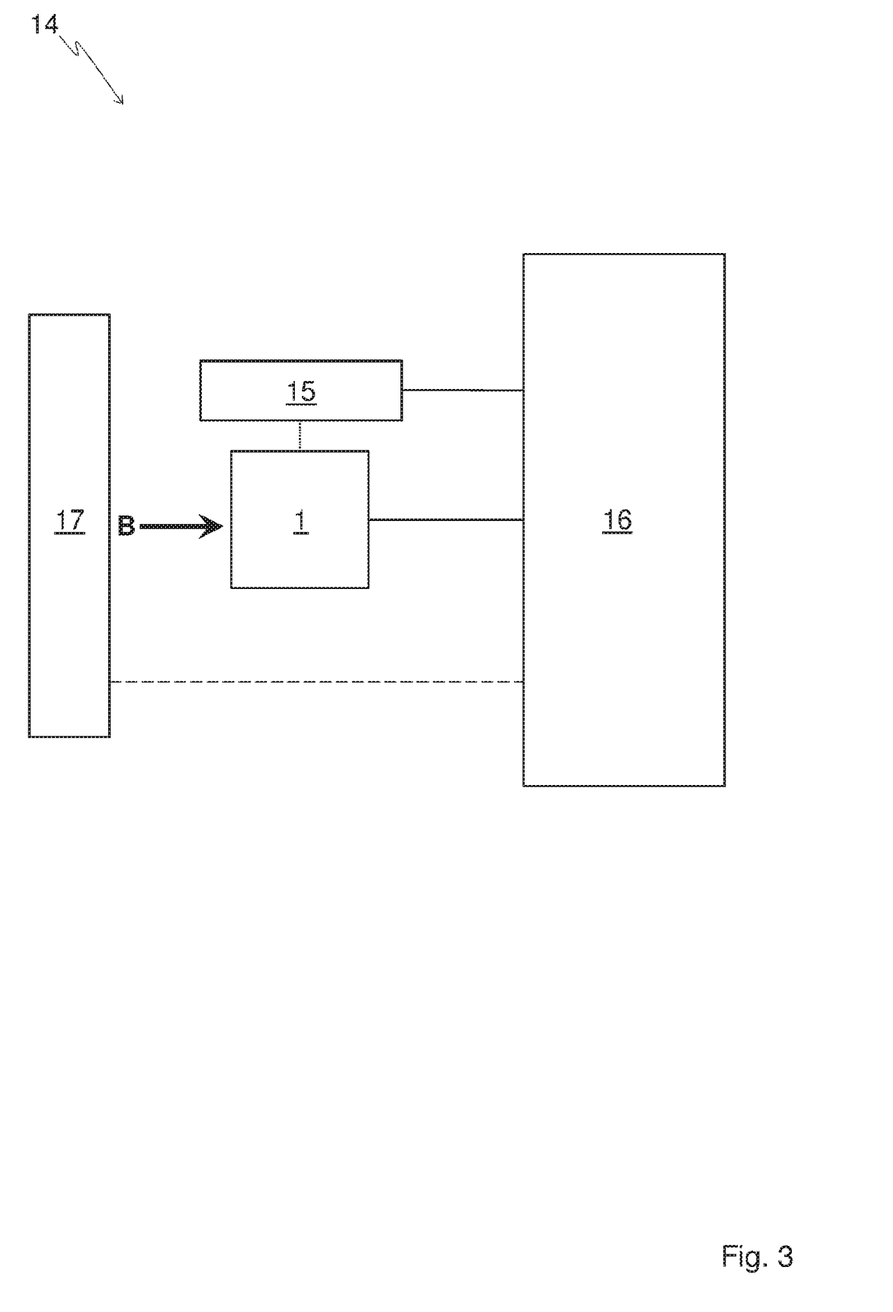
FIG. 3 a schematic block diagram of a system according to the invention, having the force sensor of FIG. 1.

FIG. 3 shows a schematic representation of a system 14 according to the invention, which comprises the force sensor 1 as well as at least one optical sensor 15. The dotted line between the at least one optical sensor 15 and the force sensor 1 indicates, in FIG. 3, that the oscillations, in particular the frequency of the oscillation structure 4 of the force sensor, are detected by means of the at least one optical sensor 15. In this regard, the optical sensor 15 is connected with a control unit 16 of the system 14, so as to be able to determine the or at least one resonance frequency of the oscillation structure 4.

Furthermore, the control unit 16 is connected with the force sensor 1 or with at least one of the conductor tracks 5*a-d* (in particular by way of the corresponding contact points 13*a-d'*), so as to apply alternating voltage to at least one of the conductor tracks 5*a-d* and to be able to excite the oscillation structure 4 to cause it to oscillate.

In practice, this can also be implemented in such a manner that the control unit 16 controls a separate alternating voltage source, which in turn is connected with the force sensor 1 or with at least one of the conductor tracks 5*a-d*. In this case, an indirect connection of the control unit 16 with the force sensor 1 is involved, or the at least one of the conductor tracks 5*a-d* has alternating voltage applied to it indirectly by means of the control unit 16.

The control unit 16 can therefore use alternating voltages having different frequencies for application—particularly one after the other—and can determine at least one resonance frequency on the basis of detection of the resulting oscillation of the oscillation structure 4, in each instance, wherein the selection of the next frequency can be made dependent on the current detection result.

Preferably, two of the conductor tracks 5*a-d* have counter-phase alternating voltage applied to them by means of the control unit 16 for excitation of an oscillation mode of the oscillation structure 4, wherein these two conductor tracks preferably lie opposite one another, for example the conductor tracks 5*a* and 5*c*.

In order to be able to determine at least one resonance frequency particularly rapidly, the control unit 16 can be designed for application of at least one pulse of alternating voltages to the at least one of the conductor tracks 5*a-d*, so as to excite the oscillation structure 4 to cause it to oscillate, wherein the at least one pulse has a bandwidth of frequencies, which bandwidth comprises the resonance frequency of at least one oscillation mode of the oscillation structure 4, preferably in an unstressed state of the force sensor 1. The sequential application of alternating voltages of different frequencies as described above is clearly more time-consuming, in comparison. In particular, proceeding from knowledge of at least one resonance frequency in the unstressed state (i.e. without any force effect on the force sensor 1), a suitable or sufficiently great frequency band can be selected, so as to determine the resonance frequency that was detuned due to the force effect.

In order to excite different resonance frequencies in targeted manner, for example so as to conveniently make use of direction dependencies of the corresponding oscillation modes for a direction-resolved force measurement, in terms of measurement technology, the control unit 16 can be designed for application to the at least one of the conductor tracks 5*a-d* of multiple pulses of alternating voltages, one after the other, wherein the different pulses comprise resonance frequencies of different oscillation modes of the oscillation structure 4, preferably in the unstressed state of the force sensor 1. In other words, a first pulse comprises at least one first resonant oscillation mode of the oscillation structure 4, preferably in the unstressed state; a further pulse comprises at least one further resonant oscillation mode of the oscillation structure 4, preferably in the unstressed state, wherein the first oscillation mode and the further oscillation mode are different.

In order to make a well-defined magnetic field available, the system 14 comprises means 17 for generation of the magnetic field. These can include, in particular, at least one permanent magnet and/or at least one Helmholtz coil. The broken line in FIG. 3 indicates that it is conceivable that the means 17 are controlled by the control unit 16, so as to adjust a desired magnetic field. For example, a Helmholtz coil can be controlled by the control unit 16.

Desired oscillation modes of the oscillation structure 4 can be set very precisely by means of ensuring a well-defined magnetic field, and this in turn allows particularly precise force measurements. In particular, in this manner excitation of what are called in-plane oscillations can be guaranteed, in other words oscillation modes having an oscillation plane or amplitude that lies in the plane of the frame. It has been shown that such in-plane oscillations allow particular precise detection of torsions of the frame 2.

REFERENCE SYMBOL LIST

1 force sensor
2 frame
3*a*, 3*b*, 3*c*, 3*d* arm
4 oscillation structure
5*a*, 5*b*, 5*c*, 5*d* conductor track
6*a*, 6*b*, 6*c*, 6*d* suspension region
7 force
8 spatial displacement of the suspension regions
9 coupling element
10*a*, 10*b*, 10*c*, 10*d* corner of the frame
11*a*, 11*b*, 11*c*, 11*d* meander-shaped section of the frame
12*a*, 12*b*, 12*c*, 12*d* temperature-compensation structure
13*a*, 13*a'*, 13*b*, 13*b'*, 13*c*, 13*c'*, 13*d*, 13*d'* contact point
14 system
15 optical sensor
16 control unit
17 means for generating a magnetic field
$B$ magnetic flux density
$F_L$ Lorentz force
$i$ alternating current

The invention claimed is:

1. A system comprising a force sensor, the force sensor comprising a frame as well as an oscillation structure, which has multiple arms and can oscillate freely in the frame,
wherein the arms are fixed in place on suspension regions of the frame and run transverse to one another, at least in certain sections,
wherein the force sensor is designed in such a manner that the suspension regions are displaced spatially relative to one another, at least in part, when the frame has a force applied to it, that the magnitude of the spatial displacement of the suspension regions depends on the magnitude of the force, that the spatial displacement of the suspension regions brings about detuning of a resonance frequency of at least one oscillation mode of the oscillation structure, and that the magnitude of the detuning depends on the magnitude of the spatial displacement of the suspension regions,
wherein at least one conducting means is provided, which extends along at least two arms, so as to allow a flow of current in the form of moving charge carriers at least between two suspension regions,
wherein the at least one conducting means can have an alternating voltage applied to it, so as to excite at least one oscillation mode of the oscillation structure with a resonance frequency, particularly in an unstressed state of the force sensor, making use of the Lorentz force, when the oscillation structure is situated in a magnetic field,
wherein the system further comprises read-out means for determination of the resonance frequency,
wherein a control unit is provided configured to cause an alternating voltage to be applied to the at least one conducting means, so as to excite the oscillation structure to cause the oscillation structure to oscillate, and
wherein the control unit is connected with the read-out means for determination of the resonance frequency,
wherein the control unit is designed for applying at least one pulse of alternating voltages to the at least one conducting means, so as to excite the oscillation structure to cause the oscillation structure to oscillate,
wherein the at least one pulse has a bandwidth of frequencies, which bandwidth comprises the resonance frequency of at least one oscillation mode of the oscillation structure, and
wherein the system comprises means for generation of the magnetic field.

2. The system according to claim 1, wherein the suspension regions are disposed in the region of corners of the frame.

3. The system according to claim 1, wherein four corners of the frame are provided, which are disposed in a plane of the frame.

4. The system according to claim 3, wherein the four corners of the frame are disposed in a plane of the frame and form a rectangle.

5. The system according to claim 3, wherein the four corners of the frame are disposed in a plane of the frame and form a square in the plane.

6. The system according to claim 1, wherein the frame has at least one meander-shaped section.

7. The system according to claim 6, wherein the at least one meander-shaped section is disposed between at least two suspension regions.

8. The system according to claim 1, wherein the number of arms is a whole-number multiple of four.

9. The system according to claim 8, wherein the number of arms is precisely four.

10. The system according to claim 1, wherein the oscillation structure has a coupling element by means of which the arms are mechanically coupled with one another.

11. The system according to claim 10, wherein the coupling element forms an edge around a surface.

12. The system according to claim 11, wherein the coupling element is polygonal.

13. The system according to claim 12, wherein each arm is fixed in place on the coupling element in the region of a corner point of the element.

14. The system according to claim 12, wherein the coupling element is four-cornered.

15. The system according to claim 14, wherein the coupling element is rectangular.

16. The system according to claim 14, wherein the coupling element is square.

17. The system according to claim 10, wherein each arm is fixed in place on the coupling element with one end.

18. The system according to claim 10, wherein the coupling element forms an edge around a surface that lies in a plane of the frame.

19. The system according to claim 1, wherein the arms are fixed in place on the respective suspension region, in each instance, by means of a temperature-compensation structure that is meander-shaped at least in certain sections.

20. The system according to claim 1, wherein the frame and the oscillation structure are produced in one piece from silicon.

21. The system according to claim 20, wherein the frame and the oscillation structure are produced in one piece from mono-crystalline silicon.

22. The system according to claim 1, wherein at least two conducting means are provided and the control unit is designed for applying counter-phase alternating voltages to the at least two conducting means.

23. The system according to claim 1, wherein the control unit is designed for application of multiple pulses of alternating voltages to the at least one conducting means, one after the other, wherein the different pulses comprise resonance frequencies of different oscillation modes of the oscillation structure.

24. The system according to claim 1, wherein the system comprises at least one permanent magnet and/or at least one Helmholtz coil.

25. The system according to claim 1, wherein the control unit is designed for excitation of oscillations of the oscillation structure in a plane of the frame.

26. A prosthesis comprising the system according to claim 1.

* * * * *